US012183133B2

(12) United States Patent
Dirickx et al.

(10) Patent No.: US 12,183,133 B2
(45) Date of Patent: Dec. 31, 2024

(54) METHOD AND SYSTEM FOR DETERMINING OPERATING PERFORMANCE PARAMETERS OF A DEVICE

(71) Applicant: Siemens Industry Software NV, Leuven (BE)

(72) Inventors: Tom Dirickx, Zonhoven (BE); Ludovico Ruga, Leuven (BE)

(73) Assignee: Siemens Industry Software NV, Leuven (BE)

( * ) Notice: Subject to any disclaimer, the term of this patent is extended or adjusted under 35 U.S.C. 154(b) by 0 days.

(21) Appl. No.: 18/553,481

(22) PCT Filed: Mar. 1, 2022

(86) PCT No.: PCT/EP2022/055054
§ 371 (c)(1),
(2) Date: Sep. 29, 2023

(87) PCT Pub. No.: WO2022/207212
PCT Pub. Date: Oct. 6, 2022

(65) Prior Publication Data
US 2024/0087376 A1 Mar. 14, 2024

(30) Foreign Application Priority Data
Mar. 29, 2021 (EP) .................................... 21165650

(51) Int. Cl.
*G07C 5/08* (2006.01)
*B62D 15/02* (2006.01)

(52) U.S. Cl.
CPC ......... *G07C 5/0808* (2013.01); *B62D 15/021* (2013.01); *G07C 5/0825* (2013.01)

(58) Field of Classification Search
CPC ... G07C 5/0808; G07C 5/0825; B62D 15/021
See application file for complete search history.

(56) References Cited

U.S. PATENT DOCUMENTS

| 2008/0306666 A1 | 12/2008 | Zeng |
| 2015/0375719 A1 | 12/2015 | Zhang |

(Continued)

FOREIGN PATENT DOCUMENTS

| CN | 101327796 A | 12/2008 |
| CN | 107074241 A | 8/2017 |

(Continued)

OTHER PUBLICATIONS

Anderson, Rusty, and David M. Bevly. "Estimation of tire cornering stiffness using GPS to improve model based estimation of vehicle states." IEEE Proceedings. Intelligent Vehicles Symposium, 2005.. IEEE, 2005. pp. 801-806.

(Continued)

*Primary Examiner* — Thomas Ingram
(74) *Attorney, Agent, or Firm* — Lempia Summerfield Katz LLC

(57) ABSTRACT

A method of determining operational performance parameters of a device (e.g., of a vehicle) with device mounted sensors and computer-implemented models. Further, a system, such as a virtual sensor applied to a device, such as a vehicle, for determining operational performance parameters of the device is provided. The system includes device mounted sensors and at least one processing unit configured to execute the computer-implemented method to generate an output parameter set. Measured data may be combined, and calculated parameters may be provided to a Kalman-filter to enable virtual sensing of unobservable parameters.

8 Claims, 1 Drawing Sheet

(56) References Cited

U.S. PATENT DOCUMENTS

| | | |
|---|---|---|
| 2017/0247038 A1 | 8/2017 | Savaresi |
| 2018/0261095 A1 | 9/2018 | Qiu |
| 2018/0267496 A1 | 9/2018 | Wang |
| 2018/0284150 A1 | 10/2018 | Takahashi |
| 2019/0280674 A1 | 9/2019 | Berkemeier |
| 2019/0369616 A1 | 12/2019 | Ostafew |
| 2020/0388087 A1 | 12/2020 | Kim |
| 2022/0017118 A1* | 1/2022 | Shinomoto ........... B60W 10/04 |

FOREIGN PATENT DOCUMENTS

| | | |
|---|---|---|
| CN | 108574929 A | 9/2018 |
| CN | 108628595 A | 10/2018 |
| CN | 110454290 A | 11/2019 |
| CN | 110488629 A | 11/2019 |
| CN | 110920539 A | 3/2020 |
| DE | 4123053 C2 | 5/2000 |
| JP | 2012131495 A | 7/2012 |
| KR | 20150134349 A | 12/2015 |
| KR | 20170035142 A | 3/2017 |
| KR | 20200115710 A | 10/2020 |
| KR | 20200140449 A | 12/2020 |
| WO | 2005062984 A2 | 7/2005 |
| WO | 2017175844 A1 | 10/2017 |

OTHER PUBLICATIONS

Baffet, Guillaume, Ali Charara, and Daniel Lechner. "Estimation of vehicle sideslip, tire force and wheel cornering stiffness." Control Engineering Practice 17.11 (2009): 1255-1264.

Naets, Frank, et al. "Design and experimental validation of a stable two-stage estimator for automotive sideslip angle and tire parameters." IEEE Transactions on Vehicular Technology 66.11 (2017): 9727-9742.

PCT International Search Report and Written Opinion of International Searching Authority mailed Jun. 10, 2022 corresponding to PCT International Application No. PCT/EP2022/055054 filed Mar. 1, 2022.

Ricci, Mirko. Vehicle parameters estimation techniques in low response maneuvers. Diss. Politecnico di Torino, 2018. pp. 1-94.

van Aalst, Sebastiaan, et al. "An adaptive vehicle sideslip estimator for reliable estimation in low and high excitation driving." IFAC—PapersOnLine 51.9 (2018): 243-248.

* cited by examiner

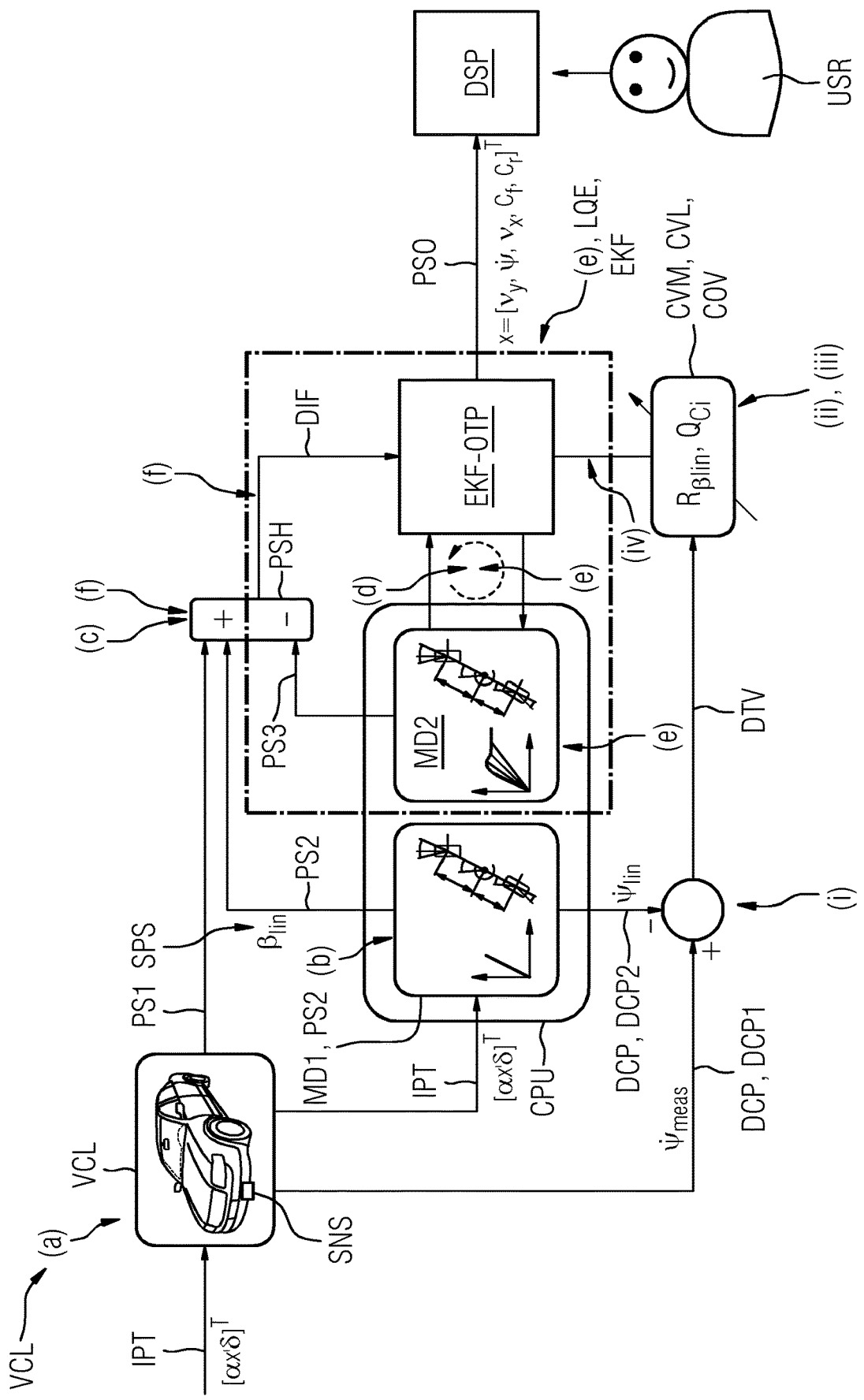

METHOD AND SYSTEM FOR DETERMINING OPERATING PERFORMANCE PARAMETERS OF A DEVICE

This application is the National Stage of International Application No. PCT/EP2022/055054, filed Mar. 1, 2022, which claims the benefit of European Patent Application No. EP 21165650.9, filed Mar. 29, 2021. The entire contents of these documents are hereby incorporated herein by reference.

FIELD

The present embodiments relate to determining operational performance parameters of a device with device mounted sensors and computer-implemented models.

BACKGROUND

From the documents: F. Naets, S. van Aalst, B. Boulkroune, N. E. Ghouti and W. Desmet, "Design and Experimental Validation of a Stable Two-Stage Estimator for Automotive Sideslip Angle and Tire Parameters," (in IEEE Transactions on Vehicular Technology, vol. 66, no. 11, pp. 9727-9742, November 2017, doi: 10.1109/TVT.2017.2742665), S. van Aalst, F. Naets, B. Boulkroune, W. Nijs and W. Desmet, "An Adaptive Vehicle Sideslip Estimator for Reliable Estimation in Low and High Excitation Driving," IFAC-PapersOnLine, vol. 51, no. 9, pp. 243-248, 2018, it is known that by coupling a single-track vehicle model and an adaptive linear tire model, the non-linear relation between tire slip angle and lateral force may be considered only for high values of the tire slip angle.

As in M. Ricci, "Vehicle parameters estimation techniques in low response maneuvers," 2018, proposed, the accuracy of the estimated lateral velocity may be improved by considering roll motion.

From the documents: BAFFET G ET AL: "Estimation of vehicle sideslip, tire force and wheel cornering stiffness," CONTROL ENGINEERING PRACTICE, PERGAMON PRESS, OXFORD, GB, vol. 17, no. 11, 1 Nov. 2009 (2009-11-01), pages 1255-1264, XP026666765, ISSN: 0967-0661, DOI: 10.1016/J.CONENGPRAC.2009.05.005, ANDERSON R ET AL: "Estimation of tire cornering stiffness using GPS to improve model based estimation of vehicle states," INTELLIGENT VEHICLES SYMPOSIUM, 2005. PROCEEDINGS. IEEE LAS VEGAS, NV, USA Jun. 6-8, 2005, PISCATAWAY, NJ, USA, IEEE, PISCATAWAY, NJ, USA, 6 Jun. 2005 (2005-06-06), pages 801-806, XP010833895, DOI: 10.1109/IVS.2005.1505203 ISBN: 978-0-7803-8961-8, aspects are respectively known.

The steering angle at the steering wheel may be one of the inputs of the vehicle models. The steering angle is typically obtained by measuring the angle at the steering wheel and dividing the angle by a known ratio. This relation, however, is known to be non-linear. An estimator to address this issue is proposed in: G. Streppa, "Rotational motion identification from MEMS inertial sensors," 2018.

Virtual sensing in the automotive field has mostly been used in the field of vehicle control. Analysis and testing require a higher degree of precision than conventional automotive estimators, as non-linear phenomena that are usually considered negligible in such application are to be considered.

This is especially true in the challenging on-center driving scenario (e.g., driving straight), where even quantities that are easily measured at higher lateral accelerations become unreliable, such as the lateral velocity.

SUMMARY OF THE INVENTION

The scope of the present invention is defined solely by the appended claims and is not affected to any degree by the statements within this summary.

The present embodiments aim to extend the use of virtual sensors to the domain of vehicle dynamics analysis as an alternative to current extensive testing approaches, which are expensive and time-consuming.

The present embodiments may obviate one or more of the drawbacks or limitations in the related art. For example, determination of operational parameters of a device, such as a vehicle, may be improved to enable dynamic analysis and testing and to take current practice in that field to a higher degree of precision, such as for automotive estimators for non-linear phenomena (e.g., on-center driving scenarios).

The present embodiments relate to a virtual sensor or virtual/soft sensing (e.g., proxy sensing, inferential sensing, or surrogate sensing), such as for a vehicle, enabling feasible and economical alternatives to costly or impractical physical measurement instrumentation. Virtual sensing is an estimation technique based on the combination of physically measured data and suitable models to obtain an estimation of the desired quantities in the area of interest without applying real sensors or directly contacting the object, or the improvement of a directly measured quantity (e.g., increased stabilization and reliability, noise reduction).

The present embodiments provide a computer-implemented method of determining operational performance parameters of a device (e.g., of a vehicle), with device mounted sensors and computer-implemented models, including the acts: (a) measuring a first parameter set during operation of the device using the sensors; (b) providing a computer-implemented supplemental model and determining a second parameter set by the supplemental model; (c) combining parameters of the first parameter set with at least one selected parameter of the second parameter set obtaining a hybrid parameter set; (d) providing the parameters of the hybrid parameter set to a Kalman-Filter-module; (e) the Kalman-Filter-module predicting a third parameter set by a second model being equivalent to the hybrid parameter set regarding the respective parameter types; (f) the Kalman-Filter-module comparing the parameters of the hybrid parameter set and the third parameter set; and (g) the Kalman-Filter-module estimating an output parameter set.

A computer-implemented embodiment according to the present embodiments is one that involves the use of a computer, computer network, or other programmable apparatus, where one or more features are realized wholly or partly by a computer program. Every method act according to the present embodiments that may be understood in the light of the description or the claims by a person with ordinary skill in the art to be done as a computer-implemented step may be considered as a computer-implemented act of the method. The computer-implemented method may contain some acts to be done without the computer.

A Kalman filter according to the present embodiments is a linear quadratic estimation method using a series of measurements observed over time, which may contain statistical noise and other inaccuracies. The Kalman filter produces estimates of unknown variables. The Kalman filter may be considered the optimal linear estimator for linear system models with additive independent white noise in both the transition and the measurement systems.

One difference between the present embodiments and the prior art is that particular focus is placed on the estimation of the desired quantities, for example, in situations where only low values and/or a low dynamic for these quantities is expected. In such cases, these quantities are normally set to constant or to zero. For example, in case of vehicle dynamics, the cornering stiffness and sideslip angle are set to constant or zero values in situations when the steering angle is small (e.g., "on-center performance", when limited steering actions are performed to stay on a straight line on the highway). The present embodiments propose to consider two different models: one to prepare the hybrid parameter set and the other as part of the Kalman-filter by, for example, considering a non-linear behavior (e.g., of the tire slip of a vehicle). This may be characteristic for low values of the slip angle, where, instead, conventionally these quantities are considered to be zero, constant, or at least linear in behavior. In case of vehicle dynamics, for example, a cornering stiffness for at least one vehicle tire obtained by the method according to the present embodiments may be used to compute the lateral loads of the vehicle.

According to the present embodiments, additional acts are provided as: (i) determining a deviation between respectively one distinct parameter of the first parameter set and the equivalent parameter of the second parameter set; (ii) providing a correlation between the deviation values and covariance values for at least one parameter of the third parameter set; (iii) determining a covariance value from the correlation based on the determined deviation; and (iv) forwarding the covariance value to the Kalman-Filter-module for estimating the output parameter set.

The covariances represent the level of uncertainty on a determined measure or estimate, in a Kalman filter. This feature uses the covariances as tuning parameters to adjust the final estimator performance.

In one embodiment, the device to which the present embodiments are applied is a vehicle, and that at least one selected parameter may be a vehicle side slip angle.

In another embodiment, the parameter sets respectively include a lateral velocity, longitudinal velocity, yaw rate, lateral acceleration, front cornering stiffness, rear cornering stiffness, or any combination thereof.

In one embodiment, the Kalman-Filter-module may be an extended Kalman-filter, which is the nonlinear version of the Kalman filter that linearizes about an estimate of the current mean and covariance. The extended Kalman-filter adapts multivariate Taylor series expansions to linearize a model about a working point. If the system model is inaccurate, Monte Carlo methods (e.g., particle filters) may be employed for estimation. The extended Kalman filter may be non-linear but may be differentiable functions.

One application of the present embodiments to a vehicle provides that an input to the supplemental model and/or the second model, respectively, is a longitudinal acceleration and/or a steering angle. These quantities may be easily acquired by conventional measurement equipment and may even be part of the standard equipment of an average vehicle.

Best accuracy of the outputted estimate may be obtained when the supplemental model is of a linear type and said second model is of a non-linear type. This enables to use the benefits of both model types, for example, depending on the operational situation. The linear-type model may, for example, be a single-track vehicle model, and the non-linear-type model may be an adaptive linear tire model.

In case of tuning the common filter output by the covariance adjustment, one embodiment provides that the distinct parameter for determination of the covariance value is the yaw rate, and the covariance value determined from the correlation based on the determined deviation is forwarded to the Kalman filter as a covariance of a cornering stiffness of a vehicle tire of the vehicle. The correlation provides a lower covariance value in case of a lower deviation and a higher covariance value in case of a higher deviation.

One usage of the method according to the present embodiments may be to inform the operator or user by displaying at least one parameter of the output parameter set or a modified parameter based on the output parameter set on a display to a user. One embodiment of a system therefore provides a display for displaying at least one parameter of the output parameter set or a modified parameter based on the output parameter set on a display to a user.

The method according to the present embodiments may beneficially be used in the context of a virtual sensor applied to a device (e.g., to a vehicle) for determining operational performance parameters of the device. The system includes device mounted sensors and at least one processing unit configured to execute the computer-implemented method according to the present embodiments.

Visual sensors as such may be understood as a specific digital twin simulating one part of the real world and being connected to a feedback by sensors measuring physical entities to align the simulation with the real world environment around the virtual sensing location.

Advantageous configurations and embodiments of the method according to the present embodiments follow from the claims, as well as aspects of the following descriptions.

BRIEF DESCRIPTION OF THE DRAWINGS

FIG. 1 shows a schematic diagram illustrating method acts according to an embodiment and a system according to an embodiment as a virtual sensor.

The illustration in the drawings is in schematic form. In different figures, similar or identical parameters may be provided with the same reference signs.

DESCRIPTION OF THE DRAWINGS

FIG. 1 shows a schematic illustration of method acts according to the present embodiments as well as a system for carrying out the method. The system is a virtual sensor. FIG. 1 shows the method applied to a device DVC (e.g., a vehicle VCL), in which the method according to the present embodiments may be incorporated. A measuring [act a] of the first parameter set PS1 during operation of the vehicle VCL is performed using sensors SNS. The vehicle VCL receives a steering angle $\delta$ at a steering wheel and a longitudinal acceleration $a_x$ as an input IPT from a user, respectively, from an engine of the car. The steering angle $\delta$ may be obtained by measuring the angle at the steering wheel and dividing the measured angle by a known ratio. The longitudinal acceleration $a_x$ may be obtained by accelerometers. This input IPT is forwarded to a computer-implemented supplemental model MD1 for determining a second parameter set PS2 [act b].

The supplemental model MD1 is a linear model. The supplemental model MD1 receives a virtual sideslip angle $\beta_{lin}$, which may be considered a virtual measurement, obtained by integrating over time the linear supplemental model MD1, assuming that under small angle assumption for a sideslip angle $$\beta_{lin} = \frac{v_{y\,lin}}{v\_x}$$

may be applied, with $v_y$:=lateral velocity, $v_x$:=longitudinal velocity.

The supplemental model MD1 may be formulated as follows:

$$\begin{cases} \dot{v}_{y\,lin} = \frac{-2\cdot(\overline{C_f}+\overline{C_r})}{m\cdot v_x}v_{y\,lin} - \left(\frac{2\cdot(\overline{C_f}\cdot l_f - \overline{C_r}\cdot l_r)}{m\cdot v_x} + v_x\right)\dot{\psi}_{lin} + \frac{2\cdot\overline{C_f}}{m}\delta \\ \ddot{\psi}_{lin} = \frac{-2\cdot(\overline{C_f}\cdot l_f - \overline{C_r}\cdot l_r)}{I_{zz}\cdot v_x}v_{y\,lin} - \frac{2\cdot(\overline{C_f}\cdot l_f^2 + \overline{C_r}\cdot l_r^2)}{I_{zz}\cdot v_x}\dot{\psi}_{lin} + \frac{2\cdot\overline{C_f}\cdot l_f}{I_{zz}}\delta \end{cases}$$

where $u=[v_x, \delta]^T$ is the input vector of the supplemental model MD1 (e.g., originating from input IPT: steering angle $\delta$, longitudinal acceleration $a_x$), and $\overline{C_f}$ and $\overline{C_r}$ are front and rear cornering stiffnesses, respectively, assumed in this model to be constant.

Further, this supplemental model MD1 refers to:

$\dot{\psi}_{lin}$ Yaw rate $l_f$, $l_r$ distance between the center of gravity and the front and rear axles respectively m Vehicle mass $I_{zz}$ Vehicle yaw inertia.

In the next act (c), parameters of the first parameter set PS1 with at least one selected parameter SPS (e.g., pin) of the second parameter set PS2 are combined, obtaining a hybrid parameter set PSH. This hybrid parameter set PSH includes measured quantities, and at least one calculated quantity is considered as a virtual sensor measurement.

During the subsequent act (d), the parameters of the hybrid parameter set PSH are provided to a Kalman-Filter-module EKF.

The Kalman-Filter-module EKF predicts a third parameter set PS3 by a second model MD2 being equivalent to the hybrid parameter set PSH regarding the respective parameter types within act (e). Here, the Kalman-Filter-module EKF is an extended Kalman filter employing a single-track model coupled with an adaptive linear tire model, resulting in the set of state equations:

$$\begin{cases} \dot{v}_y = \frac{-2(C_f+C_r)}{m\cdot v_x}v_y - \left(\frac{2(C_f\cdot l_f - C_r\cdot l_r)}{m\cdot v_x} + v_x\right)\dot{\psi} + \frac{2\cdot C_f}{m}\delta \\ \ddot{\psi} = \frac{-2(C_f\cdot l_f - C_r\cdot l_r)}{I_{zz}\cdot v_x}v_y - \frac{2(C_f\cdot l_f^2 + C_r\cdot l_r^2)}{I_{zz}\cdot v_x}\dot{\psi} + \frac{2\cdot C_f\cdot l_f}{I_{zz}}\delta \\ \dot{v}_x = a_x + v_y\cdot\dot{\psi} \\ \dot{C}_f = 0 \\ \dot{C}_r = 0 \end{cases}$$

$x=[v_y, \dot{\psi}, v_x, C_f, C_r]^T$ is the Kalman-filter-state-vector, and $u=[a_x, \delta]^T$ is the input vector with a meaning of the symbols as explained above.

The cornering stiffness values $C_f$, $C_r$ are modeled with a random walk model to consider the non-linear behavior of the tire even at low levels of lateral acceleration (e.g., as in the on-center driving condition).

The initial output equation set of the Kalman-Filter-module EKF is:

$$\begin{cases} \dot{\psi} = \dot{\psi} \\ a_y = \frac{-2\cdot(C_f+C_r)}{m\cdot v_x}v_y - \frac{2\cdot(l_f\cdot C_f - l_r\cdot C_r)}{m\cdot v_x}\dot{\psi} + \frac{2\cdot C_f}{m}\delta \\ v_x = v_x \end{cases}$$

The final output equation of the Kalman-Filter-module EKF is obtained by augmenting this equation with the virtual measurement of the sideslip angle $\beta_{lin}$, which was obtained from the supplemental model MD1 (e.g., by integrating over time the above referenced linear model). The final equations result as:

$$\begin{cases} \dot{\psi} = \dot{\psi} \\ a_y = \frac{-2\cdot(C_f+C_r)}{m\cdot v_x}v_y - \frac{2\cdot(l_f\cdot C_f - l_r\cdot C_r)}{m\cdot v_x}\dot{\psi} + \frac{2\cdot C_f}{m}\delta \\ v_x = v_x \\ \beta_{lin} = \frac{v_{y\,lin}}{v_x} \end{cases}$$

where $y=[\dot{\psi}, a_y, v_x, \beta_{lin}]$ is the output vector including quantities as explained above.

The virtual measurement of the sideslip angle $\beta_{lin}$ provides a reliable reference during straight driving, when the cornering stiffnesses are basically unobservable. Further, the virtual measurement of the sideslip angle $\beta_{lin}$ provides an additional reference for the lateral velocity, which is very difficult to measure (e.g., at low levels of lateral acceleration).

In method act (f), the Kalman-Filter-module EKF compares the parameters of the hybrid parameter set PSH and the third parameter set PS3. This is illustrated in FIG. 1 by determination of a difference DIF.

In act (g), the extended Kalman-Filter-module EKF estimates an output parameter set PSO by a Kalman-Filter-output-module EKF-OTP. The estimation is done in a known manner as a linear quadratic estimation LQE. The linear quadratic estimation LQE is an algorithm using the measurements including the history of measurements. These measurements may include statistical noise and other inaccuracies. The Kalman-Filter-module EKF produces estimates of the state variables that are likely to be more accurate than those based on single measurements alone. The Kalman-Filter-module EKF estimates a joint probability distribution over the variables for each timeframe.

Using a virtual reference such as $\beta^{lin}$, as a result of a simplified model (e.g., supplemental model MD1), may correctly represent the actual behavior of the vehicle in certain operating conditions but may also lead to errors and limitations during others.

FIG. 1 shows additional acts to cope with this issue respectively to increase accuracy by: (i) determining a deviation DVT between respectively one distinct parameter DCP, DCP1 of the first parameter set PS1 and the equivalent parameter DCP, DCP2 of the second parameter set PS2; (ii) providing a correlation CVL between the deviation DVT values and covariance values COV for at least one parameter of the third parameter set PS3; (iii) determining a covariance value COV from the correlation CVC based on the determined deviation DVT; and (iv) forwarding the covariance value COV to the Kalman-Filter-module EKF for estimating the output parameter set PSO.

As illustrated in FIG. 1, a covariance module CVM provides covariance values COV based on a predetermined correlation.

The deviation DVT is a measure of non-linearity determining whether the linear supplemental model MD1 is reliable at each time step. This is done here, as:

$$DVT(N)=|\dot{\psi}_{meas}(N)-\dot{\psi}_{lin}(N)|$$

The deviation DVT value is then used to adapt covariance values COV for at least one parameter of the third parameter set PS3 (e.g., the covariance values of the cornering stiffnesses, $Q_{C_f}$ and $Q_{C_r}$ and of the virtual sideslip angle measurement $R_{\beta_{lin}}$). The covariances COV are used as tuning parameters to adjust the final estimator performance according to the trust placed in either the model or the measure.

In one embodiment, the correlation CVL between the deviation DVT values and covariance values COV may provide a lower covariance value in case of a lower deviation and a higher covariance value in case of a higher deviation. In detail, the following ruling may be applied:

$\dot{\psi}_{meas} \sim \dot{\psi}_{lin} \rightarrow$ DVT is small: the tire is behaving linearly. In this case,
  $Q_{C_f}$, $Q_{C_r}$ are set to low values since under linear tire behavior the cornering stiffnesses do no need to be adapter
  $R_{\beta_{lin}}$ is set to a low value since $\beta_{lin}$ accurately predicts the vehicle behavior
$\dot{\psi}_{meas} \neq \dot{\psi}_{lin} \rightarrow$ DVT is large: the tire is behaving in a non-linear way. In this case,
  $Q_{C_f}$, $Q_{C_r}$ are set to high values since the cornering stiffnesses values are not reliable in this condition and need to be adapted
  $R_{\beta_{lin}}$ is set to a high value since $\beta_{lin}$ is no longer an accurate estimate of the vehicle sideslip angle
$\dot{\psi}_{meas} = \dot{\psi}_{lin} \rightarrow$ DVT=0: this occurs in straight driving, where no lateral excitation is present. In this case,
  $Q_{C_f}$, $Q_{C_r}$ are set to zero to stabilize the estimator and avoid drifting of the cornering stiffnesses
  $R_{\beta_{lin}}$ is set to a low value since $\beta_{lin}$ accurately predicts the vehicle behavior during straight driving.

The System SYS shown in FIG. 1 includes at least one processing unit CPU configured to execute the computer-implemented method according to the present embodiments to generate the output parameter set PSO. The System SYS further includes a display DSP for displaying at least one parameter of the output parameter set PSO or a modified parameter based on the output parameter set PSO on a display DSP to a user USR.

Although the present invention has been described in detail with reference to the embodiments, it is to be understood that the present invention is not limited by the disclosed examples but by the scope defined by the claims, and that numerous additional modifications and variations may be made thereto by a person skilled in the art without departing from the scope of the invention defined by the independent claims.

The use of "a" or "an" throughout this application does not exclude a plurality, and "comprising" does not exclude other steps or parameters. Also, parameters described in association with different embodiments may be combined. Reference signs in the claims should not be construed as limiting the scope of the claims.

The elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent. Such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A method of determining operational performance parameters of a device with device mounted sensors and computer-implemented models-, the method being computer-implemented and comprising:
   measuring a first parameter set during operation of the device using the device mounted sensors;
   providing a computer-implemented supplemental model and determining a second parameter set by the computer-implemented supplemental model;
   combining parameters of the first parameter set with at least one selected parameter of the second parameter set, such that a hybrid parameter set is obtained;
   providing the parameters of the hybrid parameter set to a Kalman-Filter-module;
   predicting, by the Kalman-Filter-module, a third parameter set by a second model being equivalent to the hybrid parameter set regarding the respective parameter types;
   comparing, by the Kalman-Filter-module, the parameters of the hybrid parameter set and the third parameter set;
   estimating, by the Kalman-Filter-module, an output parameter set;
   determining a deviation between respectively one distinct parameter of the first parameter set and an equivalent parameter of the second parameter set;
   providing a correlation between deviation values and covariance values for at least one parameter of the third parameter set;
   determining a covariance value from the correlation based on the determined deviation;
   forwarding the covariance value to the Kalman-Filter-module for estimating the output parameter set; and
   displaying, by a display, at least one parameter of the output parameter set or a modified parameter based on the output parameter set to a user.

2. The method of claim 1, wherein the device is a vehicle, and
   wherein the at least one selected parameter is a vehicle side slip angle.

3. The method of claim 1, wherein the parameter sets respectively comprise a lateral velocity, longitudinal velocity, yaw rate, lateral acceleration, front cornering stiffness, rear cornering stiffness, or any combination thereof, and
   wherein the Kalman-Filter-module is an extended Kalman-filter.

4. The method of claim 1, wherein an input to the supplemental model, the second model, or the first model and the second model, respectively, is a longitudinal acceleration, a steering angle, or the longitudinal acceleration and the steering angle.

5. The method of claim 1, wherein supplemental model is of a linear type, and
   wherein the second model is of a non-linear type.

6. The method of claim 1, wherein the one distinct parameter for determination of the covariance value is a yaw rate, and the covariance value determined from the correlation based on the determined deviation is forwarded to the Kalman filter as a covariance of a cornering stiffness of a vehicle tire of the vehicle, and wherein the correlation provides a lower covariance value in case of a lower deviation and a higher covariance value in case of a higher deviation.

7. A system for determining operational performance parameters of a device, the system comprising:
device mounted sensors;
at least one processing unit configured to generate an output parameter set, the at least one processing unit being configured to generate the output parameter set comprising the at least one processing unit being configured to:
measure a first parameter set during operation of the device using the device mounted sensors;
provide a computer-implemented supplemental model and determine a second parameter set by the computer-implemented supplemental model;
combine parameters of the first parameter set with at least one selected parameter of the second parameter set, such that a hybrid parameter set is obtained;
provide the parameters of the hybrid parameter set to a Kalman-Filter-module;
predict, by the Kalman-Filter-module, a third parameter set by a second model being equivalent to the hybrid parameter set regarding the respective parameter types;
compare, by the Kalman-Filter-module, the parameters of the hybrid parameter set and the third parameter set;
estimate, by the Kalman-Filter-module, an output parameter set;
determine a deviation between respectively one distinct parameter of the first parameter set and an equivalent parameter of the second parameter set;
provide a correlation between deviation values and covariance values for at least one parameter of the third parameter set;
determine a covariance value from the correlation based on the determined deviation; and
forward the covariance value to the Kalman-Filter-module for estimating the output parameter set; and
a display configured to display at least one parameter of the output parameter set or a modified parameter based on the output parameter set to a user.

8. The system of claim 7, wherein the device is a vehicle.

* * * * *